(12) United States Patent
Hubert

(10) Patent No.: US 7,395,295 B2
(45) Date of Patent: Jul. 1, 2008

(54) PIPELINE CORE IN MONTGOMERY MULTIPLIER

(75) Inventor: Gerardus Tarcisius Maria Hubert, Eindhoven (NL)

(73) Assignee: NXP B.V., Eindhoven (NL)

( * ) Notice: Subject to any disclaimer, the term of this patent is extended or adjusted under 35 U.S.C. 154(b) by 721 days.

(21) Appl. No.: 10/498,446

(22) PCT Filed: Dec. 5, 2002

(86) PCT No.: PCT/IB02/05210

§ 371 (c)(1),
(2), (4) Date: Jun. 9, 2004

(87) PCT Pub. No.: WO03/052584

PCT Pub. Date: Jun. 26, 2003

(65) Prior Publication Data

US 2005/0033790 A1 Feb. 10, 2005

(30) Foreign Application Priority Data

Dec. 14, 2001 (EP) .................................. 01204908

(51) Int. Cl.
*G06F 7/00* (2006.01)
(52) U.S. Cl. .................................................. 708/492
(58) Field of Classification Search .................. 708/492
See application file for complete search history.

(56) References Cited

U.S. PATENT DOCUMENTS

| 5,513,133 A * | 4/1996 | Cressel et al. ............... 708/620 |
| 5,742,530 A * | 4/1998 | Gressel et al. .............. 708/491 |
| 2005/0033790 A1* | 2/2005 | Hubert ....................... 708/492 |
| 2006/0010192 A1* | 1/2006 | Fischer et al. ............... 708/620 |
| 2006/0064453 A1* | 3/2006 | Fischer et al. ............... 708/620 |

FOREIGN PATENT DOCUMENTS

| WO | WO 00 38047 A1 * | 6/2000 |
| WO | WO 01 76132 A1 * | 10/2001 |

OTHER PUBLICATIONS

Jye-Jong Leu et al, "A scalable low-complexity digit-serial VLSI architecture for RSA cryptosystem", 1999 IEEE, pp. 586-595.*
Jye-Jong Leu et al, "Design methodology for Booth-encoded Montgomery module design for RSA cryptosystem", 2000 IEEE, pp. V-357-V-360.*

* cited by examiner

*Primary Examiner*—Tan V. Mai
(74) *Attorney, Agent, or Firm*—Peter Zawilski

(57) ABSTRACT

A multiplier apparatus is arranged for multiplying a first long integer entity with a second long integer entity modulo a prime number. In particular, the comprises a pipelined multiplier core, whilst executing the overall multiplication in Montgomery fashion.

14 Claims, 4 Drawing Sheets

$2^{10}$ $2^9$ $2^8$ $2^7$ $2^6$ $2^5$ $2^4$ $2^3$ $2^2$ $2^1$ $2^0$ $$\begin{array}{ccccccccccc}
 & & & & & 1 & 1 & 0 & 1 & 0 & 1 \\
 & & & & \bar{1} & 1 & 0 & \bar{1} & 0 & 1 & \\
\hline
 & & & & \bar{1} & \bar{1} & 1 & 0 & 0 & 0 & 1 \\
1 & 1 & 0 & \bar{1} & 0 & 1 & & & & & \\
\hline
1 & 1 & 0 & 0 & 0 & 0 & 0 & 0 & 0 & 0 & 1 \\
\end{array}$$

$Y'_0 = 1$
$+ Y'_2 = 1$ $+ Y'_4 = 2$ $= 1537_{dec}$

FIG. 5

| Type | Augend Digit $x_i$ | Augend Digit $y_i$ | Previous Digit $x_{i-1}, y_{i-1}$ | Intermediate Carry $c_i$ | Intermediate Sum $s_i$ |
|------|------|------|------|------|------|
| 1 | 1 | 1 | don't care | 1 | 0 |
| 2a | 1<br>0 | 0<br>1 | both non-negative | 1 | $\bar{1}$ |
| 2b | 1<br>0 | 0<br>1 | one or both negative | 0 | 1 |
| 3 | 0 | 0 | don't care | 0 | 0 |
| 4 | 1<br>$\bar{1}$ | $\bar{1}$<br>1 | don't care | 0 | 0 |
| 5a | 1<br>$\bar{1}$ | $\bar{1}$<br>0 | both non-negative | 0 | $\bar{1}$ |
| 5b | 1<br>$\bar{1}$ | $\bar{1}$<br>0 | one or both negative | $\bar{1}$ | 1 |
| 6 | $\bar{1}$ | $\bar{1}$ | don't care | $\bar{1}$ | 0 |

PIPELINE CORE IN MONTGOMERY MULTIPLIER

The invention relates to a multiplier apparatus for multiplying a first long integer entity with a second long integer entity modulo a prime number, comprising a pipelined multiplier core, and being arranged for executing the overall multiplication in Montgomery fashion.

BACKGROUND OF THE INVENTION

Multiplication of long integers modulo a prime number is a basic and repetitive operation that is used for so-called public key systems and various other applications. For an efficient usage of such applications, the execution time of the multiplication should be minimum. In consequence, the invention relates in particular to an apparatus for multiplying a first long integer entity with a second long integer entity modulo a prime number. Various methods and apparatuses have been proposed for the above through using a combination of multiplication and reduction operations. In particular, often the most significant part of the result has been used to actually effect the reduction. However, the present inventor has recognized that the developing of such most significant part will substantially delay the overall operation, especially, when the available hardware should be used at the highest possible duty cycle, in that a sequence of such multiplications must be executed in a contiguous manner.

SUMMARY TO THE INVENTION

In consequence, amongst other things, it is an object of the present invention to provide a multiplier apparatus as recited in the preamble, wherein in contradistinction to the prior art, the least significant part of the actual result is used for effecting the reduction, whilst furthermore raising the fraction of time that the hardware is actually used in order to be able to cope with substantial and long sequences of such multiplications.

Now therefore, an embodiment of the invention is a multiplier apparatus that is arranged for multiplying a first long integer entity with a second long integer entity modulo a prime number, which the apparatus is characterized by comprising a pipelined multiplier core, whilst executing the overall multiplication in Montgomery fashion. In fact, the combination according to the present invention renders it more easy to keep the pipeline filled, and in consequence, to shorten the average calculation times in the overlaid operation. The multiplier apparatus is applicable for operating in GF (p), wherein p is a prime number, as well as in GF ($2^n$).

Further advantageous aspects of the invention are recited in dependent claims that define advantageous extensions to, or rather fields of application of, the principal element of the invention.

BRIEF DESCRIPTION OF THE DRAWING

These and further aspects and advantages of the invention will be discussed more in detail hereinafter with reference to the disclosure of preferred embodiments, and in particular with reference to the appended Figures that show:

FIG. 5, an arrangement of a carry-propagation-free adder;

FIG. 6, a diagram illustrating intermediate carry and sum quantities.

DETAILED DESCRIPTION OF PREFERRED EMBODIMENTS

1. Pipelined Multiplier

Figure 1:
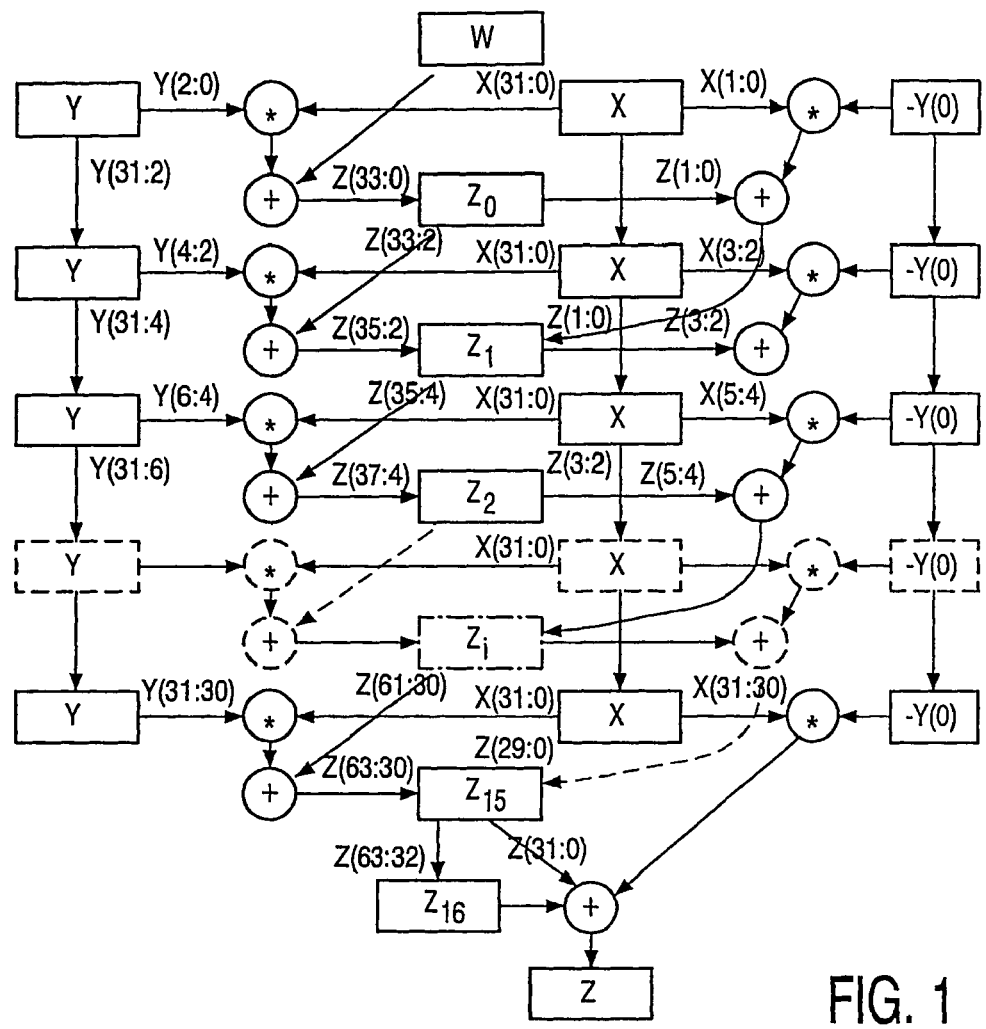
FIG. 1, a block diagram of a pipelined multiplier.

The Pipelined multiplier is designed to accept in every clock cycle two new numbers to be multiplied. The product of both is calculated in a number of stages and is ready when all stages have been run through. E.g. for a 32*32-bit multiplication, the number of stages can be 17 (16 for multiplication and 1 for the final addition). Every clock cycle a next product is calculated, but the outcome is only ready after 17 clock cycles. So at most 17 products are being processed at the same clock cycle.

For an efficient pipelined multiplier, the long-integer calculations have been designed such that the pipeline is kept filled. One has to avoid the situation that a new calculation depends on a result that is still under way. In such situation wait states would have to be inserted. This is the reason for designing the Montgomery Multiplications for Elliptic Curve Calculations differently from RSA-like calculations.

Next to the multiplication, the multiplier executes two additions P=X.Y+A+B. One of the additions is necessary for the multiplication of two long-integers, where the multiplication must be split in a number of elementary 32*32-bit multiplications.

Pipelined multipliers can be designed for different numbers of bits, e.g. 8*8 or 16*16.

2. Montgomery Multiplication

The Montgomery Multiplication calculates the product P=x.y.$R^{-1}$ mod p. Here, x and y are the inputs to be multiplied and p is the modulus of the multiplication. Furthermore, R=$2^n$, where n is the number of bits of the system, e.g. 1024 for RSA-like systems and 160 for Elliptic Curves. As an example a 32*32-bit multiplier is chosen, with 17 stages.

3. Montgomery Multiplication with Base B

This method is suitable for large values of $N_w$ as well as for RSA.

B=$2^{32}$, assuming a word size of the processor of 32-bit.

R=$B^{N_w}$, $N_w$ being the number of 32-bit words of the long-integers.

a[i] is the $i^{th}$ 32-bit Word of the number a.

T[0] is the least significant 32-bit part of the temporary variable T.

Prestored Constants:

m'=$-(p^{-1})$ mod B (32-bit wide)

prime p

Inputs: a mod p, b mod p

Output: Montgomery Product: MonPro(a,b)=a.b.$R^{-1}$ mod p

The operation is as follows:

```
T = 0
for i = 0 to N_w-1
    { T = T + a[i].b;              // N_w multiplications
      Ui = T[0].m' mod B;          // 1 multiplication
      T = (T + Ui.p)/B             // N_w multiplications
    }
If T > p then T=T-p
```

4. Calculation for 512-Bit Operands

In our example a and b consist of sixteen 32-bit words. First $T=T+a[i].b$ is calculated, starting with $i=0$.

The first calculation starts at timeslot 0 and the last one at timeslot 15. At timeslot 16 a wait cycle is added.

The first result $T[0]$ is ready at time 17. Then we calculate from that timeslot the product $Ui=T[0].m'$, which is output at timeslot 34.

The next series of calculations is $(T+Ui.p)/B$, which starts at timeslot 34 and ends at timeslot 49. The first result thereof is output at timeslot 51, but is discarded because its outcome is always zero. The second result is at timeslot 52.

From timeslot 52 on, the loop starts anew. It uses the results of the previous round, immediately when they are ready.

There are 16 rounds, so the total number of timeslots is $16*52 = 832$.

The complete result is ready at timeslot 848.

5. Calculation for 1024 Operands

First $T=T+a[i].b$ is calculated, starting with $i=0$.

We start with calculating the first 17 products.

The first result $T[0]$ is ready at timeslot 17. At that timeslot we calculate the product $Ui=T[0].m'$, which is output at timeslot 34. From timeslot 18 up to 32 we calculate the remaining products of $T=T+a[i].b$ The next series of calculations is $(T+Ui.p)/B$, which starts at timeslot 34 and ends at timeslot 65. The first results are ready, when at timeslot 66 a new round starts.

There are 32 rounds, so the total number of timeslots is $32*66 = 2112$.

The complete result is ready at timeslot 2128.

6. Calculation for 2048-BIT Operands

First $T=T+a'[i].b'$ is calculated, starting with $i=0$.

We start with calculating the first 17 products.

The first result $T[0]$ is ready at timeslot 17. At that timeslot we calculate the product $Ui=T[0].m'$, which is outputted at timeslot 34. From timeslot 18 up to $N_w$, we calculate the remaining products.

The next series of calculations is $(T+Ui.p)/B$, which starts at timeslot $N_w$ and ends at timeslot $2N_w-1$.

The first results are ready, when at timeslot $2N_w$ a new round starts.

There are $N_w$ rounds, so the total number of timeslots is $N_w.(2N_w+1)$.

The complete result is ready at timeslot $N_w.(2N_w+1)+17$ (=8273 for 2048 bit).

7. Montgomery Multiplication with Base R

The algorithm is suitable for small values of $N_w$ and also for Elliptic Curves.

$B=2^{32}$ (assumed is a word size of the processor of 32-bit)
$R=B^{Nw}$ ($N_w$ is the number of 32-bit words of the long-integers)

Prestored Constants:
 $m'=-(p^{-1})$ mod R ($m'$ is $N_w$ 32-bit wide)
 prime p

Inputs: a mod p, b mod p

Output: MonPro(a,b) = $a.b.R^{-1}$ mod p
$T=a.b$
$U=T.m'$ mod R
$T'=T+U.p$
$T=T/R$
if $T>p$ then $T=T-p$ For systems over $GF(2^n)$ all additions are modulo 2. Herein, $m'$ is the inverse of the polynomial $B=\alpha^{32}$.

8. Calculation Method

First, the complete product $T=a.b$ is calculated. This takes $N_w^2$ multiplications. The first results of T are then already there, so we can start immediately thereafter. Of the product $T.m'$ we need only to calculate the products that are smaller than R.

The product $T[0]$ is ready at timeslot 17. The calculation of $T[0]*(m[0] \ldots m[N_w-1])$ starts at timeslot $N_w^2$ and takes $N_w$ multiplications.

The product $T[1]$ is ready at timeslot $17+N_w$. The calculation of $T[1]*(m[0] \ldots m[N_w-2])$ starts at $N_w^2+N_w$ and takes $N_w-1$ multiplications The product $T[2]$ is ready at timeslot $17+2N_w$. The calculation of $T[2]*(m[0] \ldots m[N_w-3])$ starts at $N_w^2+2N_w-1$ and takes $N_w-2$ multiplications, etcetera.

The product $T[j]$ is ready at timeslot $17+j.N_w$. The calculation of $T[j]*(m[0] \ldots m[N_w-j-1])$ starts at $N_w^2+(2N_w-j+1).j/2$ and takes $N_w-j$ multiplications, etcetera.

The product $T[N_w-1]$ is ready at timeslot $17+(N_w-1).N_w$. The calculation of $T[N_w-1]*m[0]$ starts at $N_w^2+(N_w+2).(N_w-1)/2$ and takes one multiplication.

One can prove that for $N_w \geq 5$ the product $T[j]$ is always ready before the new product $T[j]*m[0]$ starts. Therefore, no wait cycles are required.

$U[0]$ is ready at timeslot $N_w^2+17$. From that moment on, the product $U.p$ is calculated.

The last multiplication starts at timeslot $N_w^2+(N_w+2).(N_w-1)/2+1$. For $N_w=5$ this is at timeslot 40 and $U[0]$ is started at timeslot 42. So there are two wait cycles required. For larger values of $N_w$, no wait cycles are required.

The calculation of $U.p$ takes $N_w^2$ timeslots.

The total number of timeslots is $2.N_w^2+(N_w+2).(N_w-1)/2+1$ for $N_w>5$

The total number of timeslots is 67 timeslots for $N_w=5$

The complete result is ready at $2.N_w^2+(N_w+2).(N_w-1)/2+18$.

9. Modified Booth Algorithm

The modified Booth algorithm is designed to take two bits of the multiplicand to do a partial multiplication. This halves the number of partial multiplications.

First the multiplier Y is recoded, where $y'_i$ may have the values $-2, -1, 0, +1$ and $+2$ (signed digit notation).

$$y'_i = -2.y_{i+1} + y_i + y_{i-1}$$

(only defined for even values of i)

$$Y = y'_{30}.2^{30} + y'_{28}.2^{28} + \ldots + y'_0.2^0$$

$$y_i' = -2y_{i+1} + y_i + y_{i-1};$$

$$y_n = 0$$

$$P = \sum_{i=1,odd}^{n-1} y'_i \cdot 2^i \cdot X =$$

$$\sum_{i=1,odd}^{n-1} (-2y_{l+1} + y_i + y_{i-1}) \cdot 2^i \cdot X == -X \sum_{i=1,odd}^{n-1} y_{l+1} \cdot 2^{i+1} +$$

$$X \cdot \sum_{i=1,odd}^{n-1} y_i \cdot 2^i + 2X \cdot \sum_{i=1,odd}^{n-1} y_{i-1} \cdot 2^{i-1} ==$$

-continued $$-X \sum_{i=2,even}^{n-1} y_i \cdot 2^i + X \cdot \sum_{i=1,odd}^{n-1} y_i 2^i + 2X \sum_{i=0}^{n-2} y_i 2^i ==$$

$$-X \sum_{i=0,even}^{n-2} y_i \cdot 2^i + X \cdot \sum_{i=1,odd}^{n-1} y_i 2^i + 2X \sum_{i=0}^{n-2} y_i 2^i + y_0 \cdot X ==$$

$$X \cdot \sum_{i=0}^{n-1} y_i 2^i + y_0 \cdot X = X \cdot Y + y_0 \cdot X$$

To get the right result, we must subtract from the product $y_0.X$

10. Subtraction Done in Parallel $X = x_{31}.2^{31} + x_{30}.2^{30} + \ldots x_1.2^1 + x_0.2^0$ $Y = y_{31}.2^{31} + y_{30}.2^{30} + \ldots y_1.2^1 + y_0.2^0$ $W = w_{31}.2^{31} + w_{30}.2^{30} + \ldots w_1.2^1 + w_0.2^0$ $Z = X.Y + W.$ In this respect, FIG. 1 is a block diagram of a pipelined multiplier embodiment. Herein, circles with an asterisk execute a multiplication, whereas circles with an addition sign will execute an addition, such as one including a carry-save operation. The various blocks will temporarily hold the quantity indicated therein. For better clarity, various interconnections show the bit rankings of the bits being transferred there along. At the right hand side, a column of blocks is used for introducing the necessary correction term.

The left part calculates $Z = X.Y + W + y_0.X$. This last term is an artifact of the algorithm. The right part subtracts the last term in parallel to the other calculations. This is the invention.

The following embodiment discloses how the multiplication is set up, but the implementation may deviate in details.

In the first timeslot $Z_0 = X.Y(1:0) + W_0$ is calculated and stored in register $Z_0$. X is transferred to the second X-register and Y(31:2) to the second Y-register.

In the second timeslot $Z_1 = X.Y(3:2) + Z_0$ is calculated and stored in register $Z_1$. Further, X is transferred to the third X-register and Y(31:2) to the third Y-register.

Moreover, $-y_0*X(1:0)$ is calculated and added to Z(1:0), etcetera.

In the 16th timeslot $Z_{15} = X.Y(31:30) + Z_{15}$ is calculated and stored in register $Z_{15}$.

Moreover, $-y_0*X(31:30)$ is calculated and added to Z(31:30).

Now, $Z_{15}$ contains 64 bits.

In the last timeslot (#17), the upper 32 bits are transferred to $Z_{16}$ and $Z_{15}$ and the two correction bits are added to the previous value of $Z_{16}$, which is outputted.

When doing long-integer multiplication $Y_i$ is inputted $N_w$ times combined with $X_0, X_1, \ldots, X_{Nw-1}$. At the beginning of a long-integer calculation, $Z_{16}$ is set to 0. Only when $X_0.Y_i + W$ reaches the output Z, then $Z_{16} = 0$ is added.

11. Montgomery Multiplication for GF($2^n$)

Elliptic Curve calculations can also be defined over the field GF($2^n$).

All additions (denoted here by a "+") in this field are modulo 2 (exclusive or).

Polynomials in this field have a degree of at most degree n−1.

So when n=32, then the polynomials X and Y are defined by (all co-efficients are either 0 or 1)

$X = x_{31}.\alpha^{31} + x_{30}.\alpha^{30} + \ldots x_1.\alpha^1 + x_0.\alpha^0$ $Y = y_{31}.\alpha^{31} + y_{30}.\alpha^{30} + \ldots y_1.\alpha^1 + y_0.\alpha^0$ There is also an irreducible polynomial p, which is defined as:

$p = p_n.\alpha^n + p_{n-1}.\alpha^{n-1} + \ldots p_1.\alpha^1 + p_0.\alpha^0.$

The product P=X.Y mod p is calculated by:

$(x_{n-1}.\alpha^{n-1} + x_{n-2}.\alpha^{n-2} + \ldots x_1.\alpha^1 + x_0.\alpha^0).(y_{n-1}.\alpha^{n-1} + y_{n-2}.\alpha^{n-2} + \ldots y_1.\alpha^1 + y_0.\alpha^0) \bmod p.$ The product X.Y is then divided by the polynomial p and the remainder is the outcome. The degree of the remainder is always less than that of p.

Both X,Y and p can be represented by long integers.

The calculation of the reduced product can be done by a normal product calculation, with the modifications that the internal additions are done modulo 2. Then the division is done as normal except for the addition being modulo 2 and keeping the remainder.

However, one can also do a Montgomery multiplication, which is much faster.

12. Montgomery Multiplication

The Montgomery Multiplication adds a multiple of the prime (irreducible polynomial) to the (partial) product, such that the product is divisible by a suitable factor R e.g. $\alpha^{32}$ or $\alpha^{160}$. For the given binary representation of the polynomials, one might also think of $2^{32}$ or $2^{160}$ instead. Herein, m' is defined as m'=$p^{-1}$ mod R, where $p^{-1}$ is defined as $p.p^{-1}$ mod R=1.

Now, the same algorithm can be applied, with the following adaptations:
  the addition within the multiplication is modulo 2
  the final subtraction is omitted.

Further details of the arrangements. In addition to the foregoing, various further details, embodiments, and explanations are being presented by way of supplement hereinafter.

13. Long-Integer Multiplier and Adder

Definitions:
  $X = x_{Nw-1}.B^{Nw-1} + \ldots + x_2.B^2 + x_1.B^1 + x_0.B^0$
  $Y = y_{Nw-1}.B^{Nw-1} + \ldots + y_2.B^2 + y_1.B^1 + y_0.B^0$
  $P_i = p_{iNw}.B^{Nw-1} + \ldots + p_{i2}.B^2 + p_{i1}.B^1 + p_{i0}.B^0$
  $P = p_{2Nw-1}.B^{2Nw-1} + \ldots + p_2.B^2 + p_1.B^1 + p_0.B^0$
  $B = 2^{32}$
  $m = N_w - 1$ Long-integer multiplication involves many multiplications of two 32-bit words. The embodiment uses a pipelined 32-bit multiplier (see FIGS. 1 and 4), which accepts in every timeslot three new 32-bit operands (X*Y+Z). Such multiplier is extremely fast. However, the output of the multiplication is only ready after 17 timeslots. So at most 17 multiplications may be calculated at the same time. However, when one wants to do a multiplication with the result of an ongoing multiplication, one has to wait for the result being ready. This can introduce wait cycles, which will decrease the performance.

$Z = X.Y + W$ $Z = X.\{Y_0.B^0 + Y_1.B^1 + \ldots Y_m B^m\} + W$

Z, X and W have a size of $N_w - 1$ 32-bit words. $Y_i$ has a width of 32 bit.

$W = W_0.B^0 + W_1.B^1 + \ldots W_m B^m\}$

Intermediate results $W_i = W_{i1}.B^0 + W_{i2}.B^1 + \ldots W_{i,m+1} B^m$
  $P_0 = X.Y_0 + W$ is calculated. The result is split up in
  $P_0 = W_0.B + Z_0$ $P_1 = X.Y_1 + W_0$ is calculated. The result is split up in $P_1 = W_1.B + Z_1$ $P_2 = X.Y_2 + W_1$ is calculated. The result is split up in $P_2 = W_2.B + Z_2$

...

$P_m = X.Y_m + W_{m-1}$ is calculated.

$Z_j = P_{mj}$ for $j \geq m$.

So we need a function which calculates $P_i = X.Y_i + W_i$.

Figure 2:
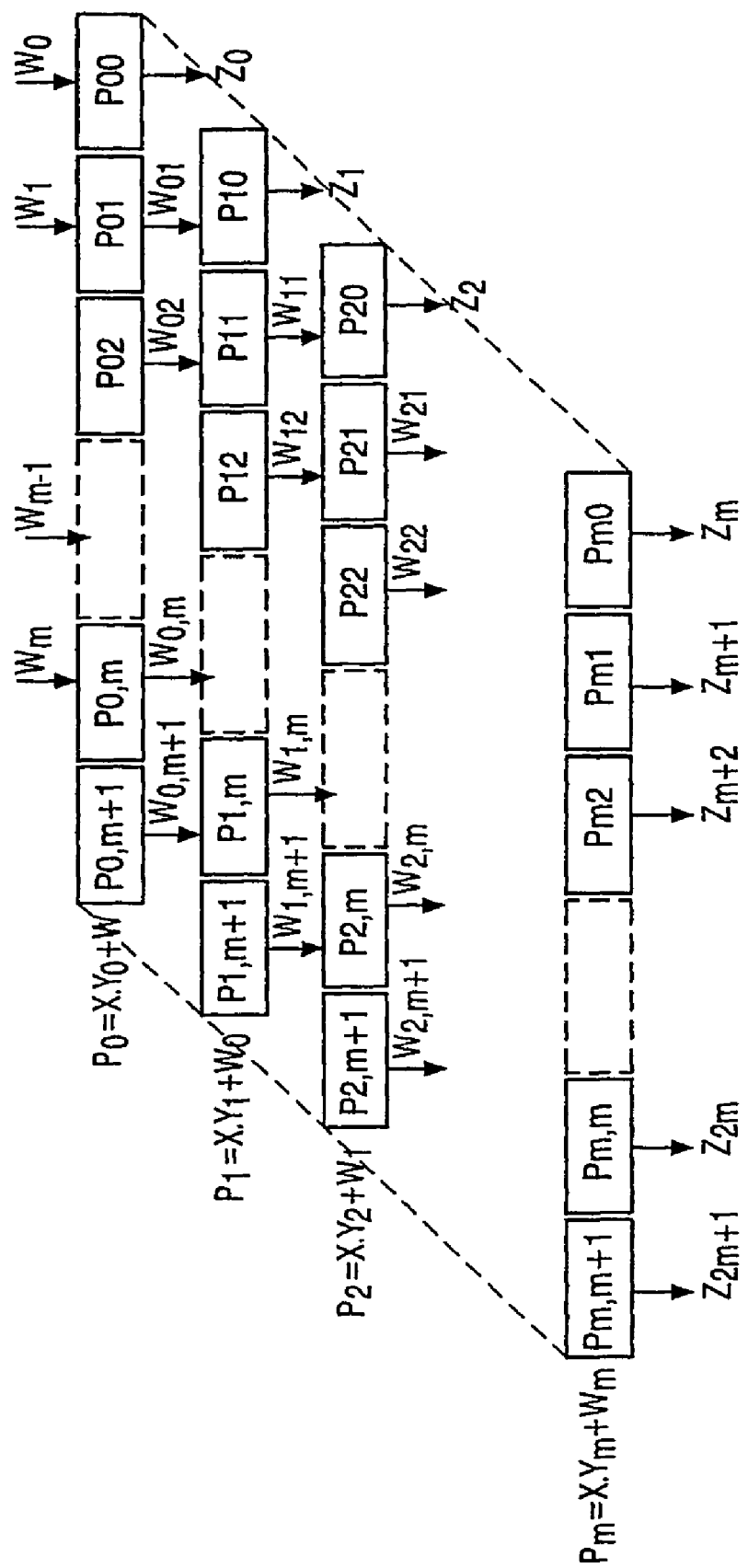
FIG. 2, a block diagram for a long integer multiplication X*Y+W.

In this respect, FIG. 2 is a block diagram of an arrangement for calculating $(X*Y+W)$.

$$P_i = X.Y_i + W$$

This calculation is part of the foregoing calculation.

X and W have a size of $m=(N_w-1)$ 32-bit words.

$Y_i$ has a width of 32 bit.

$S_1 = x_0.y_i + w_0$ is calculated. $S_1$ is split up in $Z_1.B + P_0$.

$S_2 = x_1.y_i + w_1 + Z_1$ is calculated. $S_2$ is split up in $Z_2.B + P_1$, etcetera.

$S_m = x_m.y_i + w_m + Z_{m-1}$ is calculated. $S_m$ is split up in $P_{m+1}.B + P_m$.

Figure 3:
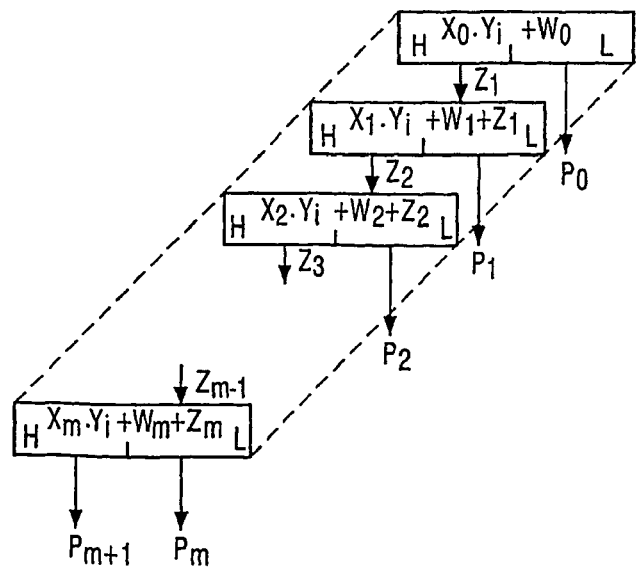
FIG. 3, a block diagram for a long integer multiplication $X_i$.Y+W.

A pertinent embodiment has been shown in FIG. 3, which is a block diagram of an arrangement for executing a long integer multiplication according to $(X*Y+W)$.

The calculation $S=x.y+w+z$ is done by the pipelined multiplier of FIG. 1, discussed in part supra.

For calculations over $GF(2^n)$ the additions are modulo 2. So there are no carries.

14. Pipelined Multiplier $$X = x_{31}.2^{31} + x_{30}.2^{30} + \ldots x_1.2^1 + x_0.2^0$$

$$Y = y_{31}.2^{31} + y_{30}.2^{30} + \ldots y_1.2^1 + y_0.2^0$$

$$W = w_{31}.2^{31} + w_{30}.2^{30} + \ldots w_1.2^1 + w_0.2^0$$

$$Z = X.Y + W.$$

The left part calculates $Z = X.Y + W + y_0.X$. This last term is an artifact of the used algorithm. The right part subtracts the last term.

The following gives an idea, how the multiplication is set up, but the implementation may deviate in details.

In the first timeslot $Z_0 = X.Y(1:0) + W_0$ is calculated and stored in register $Z_0$. X is transferred to the second X-register and $Y(31:2)$ to the second Y-register.

In the second timeslot $Z_1 = X.Y(3:2) + Z_0$ is calculated and stored in register $Z_1$. X is transferred to the third X-register and $Y(31:2)$ to the third Y-register. Moreover, $-y_0*X(1:0)$ is calculated and added to $Z(1:0)$.

...

In the 16th timeslot $Z_{15} = X.Y(31:30) + Z_{15}$ is calculated and stored in register $Z_{15}$.

Moreover, $-y_0*X(31:30)$ is calculated and added to $Z(31:30)$. $Z_{15}$ contains now 64 bit.

In the last timeslot (#17), the upper 32 bits are transferred to $Z_{16}$ and $Z_{15}$ and the two correction bits are added to the previous value of $Z_{16}$, which is output.

Doing long-integer multiplication as described in paragraph 13 then $Y_i$ is input $N_w$ times combined with $X_0$, $X_1$, ..., $X_{Nw-1}$. When $X_0.Y_i + W$ reaches the output Z, then instead of adding the contents of $Z_{16}$ nothing is added. $Z_{16}$ has the function of $Z_i$ in paragraph 13: the part that is transferred from one multiplication to the next one.

15. Modified Booth Algorithm

First the multiplier Y is recoded, where $y'_i$ may only have the values $-2, -1, 0, +1$ and $+2$ (signed digit notation).

$$y'_i = -2.y_{i+1} + y_i + y_{i-1}$$

(only defined for even values of i)

$$Y = y'_{30}.2^{30} + y'_{28}.2^{28} + \ldots + y'_0.2^0$$

e.g. when $y = 29_{dec} = 01110_{bin}$ then $y' = (2\ 1\ \bar{1})_{sd} = 2.2^4 - 1.2^2 + 1 = 29_{dec}$ where $\bar{1}$ denotes $-1$ The formula used are those disclosed in the earlier paragraph on the Modified Booth Algorithm (paragraph 9).

To get the right result, we must subtract from the product $y_0.X$.

Multiplying by 2 is left-shifting the multiplicand over 1 bit.

The partial products are coded in a radix-2 notation, where every product can have the value $-1, 0$ or $+1$.

Now the product is calculated in 16 stages. In every stage the partial product $y'_i.X.2^i$ is calculated and added to the previous result, e.g. when $x = 53_{dec} = 110101_{bin}$ and $y = 29$ ($y' = (2\ 1\ \bar{1})_{sd}$) then For a 32-bit operand there are 15 additions to be done. With a normal full adder, this takes too much time because the carry has to ripple through. To prevent this we will use a carry-propagation-free adder. In this respect, FIG. 5 illustrates an arrangement of a carry-propagation free adder.

16. Redundant Binary Notation

The Augend and the Addend of the adder are in a Redundant Binary Notation, which is also a Signed Digit notation. It has a fixed radix 2 and a digit set $\{\bar{1}, 0, 1\}$, where $\bar{1}$ denotes $-1$. An n-digit redundant binary integer Y has the value $y_{n-1}2^{n-1} + y_{n-2}2^{n-2} + \ldots + y_1.2^1 + y_0.2^0$ where $y_i$ may have the value $-1, 0$ or $1$.

There are several ways to represent an integer in the redundant binary notation, e.g. $[0101]_{SD2} = [0111]_{SD2} = [1\bar{1}01]_{SD2} = [11\bar{1}\bar{1}]_{SD2} = [101\bar{1}]_{SD2} = 5_{dec}$. Only '0' has a unique representation: $[00\ldots0]$.

Conversion from normal binary notation to redundant binary notation is simple: both are the same.

Conversion from redundant binary notation to the normal one is done by the following subtraction: $X_{bin} = X^+ - X^-$, where $X^+$ is got from $X_{sd2}$ by replacing all '$\bar{1}$' by '0' and $X^-$ is got from $X_{sd2}$ by replacing all '1's by '0' and all '$\bar{1}$'s by '1'.

For example, when $X = [10\bar{1}1]_{SD2} = 5_{dec}$, then $X^+ = [1000]_{bin} = 8_{dec}$ and $X^- = [0011]_{bin} = 3_{dec}$.

Negating a variable is done by replacing all '1's by '$\bar{1}$' and '$\bar{1}$'s by '1'.

For example, when $X = [10\bar{1}1]_{SD2} = 5_{dec}$, then $-X = [\bar{1}01\bar{1}]_{SD2} = -5_{dec}$ We will encode a variable as follows (see Table 1)

TABLE 1

Encoding of X for GF(p) in redundant binary notation (x = don't care).

| X | Output $x^+x^-$ | Input $x^+x^-$ |
|---|---|---|
| 0 | 00 | 00 |
| 1 | 10 | 1x |
| $\bar{1}$ | 01 | x1 |

The combination 11 is never used.

Therefore, when X is input and $X=1$, than the condition $x^+=1$ is sufficient.

Likewise, when $X=\bar{1}$ than $x^-=1$ suffices.

17. Carry-Propagation-Free Adder

The representation is chosen such, that a possible carry is absorbed in the next digit and does not influence the next carry. Therefore, the speed of such an adder is much higher than that of a 32-bit full adder.

As for the 32*32-bit multiplier, there are 16 additions (inclusive the upper most significant word of the previous multiplication). Then only at the end, the redundant binary notation is converted to the normal binary notation. This conversion is not propagation free.

The addition is done in *(conceptually) 2 steps. First an Intermediate Sum $s_i$ and an Intermediate Carry $c_i$ are calculated. In the second step, both are converted to the final sum ($sum_i$). This intermediate carry may depend utmost on the value of the present and the previous digits, but not on still earlier ones.

$c_i$ and $s_i$ satisfy the following equation: $2c_i+s_i=x_i+y_i$. Furthermore, $c_{c-1}$ $s_i$ are chosen such that both are never $\bar{1}$ nor 1.

In this respect, FIG. 6 is a diagram illustrating the generating of intermediate carry and sum quantities.

The sum $S_i=c_i+s_{i-1}$ will not give a new carry:
type 1,3,4 and 6: $c_{i-1}+s_i=c_{i-1}$
type 2a,5a: $c_{i-1}\ne 1$, i.e. 0 or $\bar{1}$, so $c_{i-1}+s_i$ is either 1 or 0.
type 2b,5b: $c_{i-1}\ne \bar{1}$, i.e. 0 or 1, so $c_{i-1}+s_i$ is either $\bar{1}$ or 0.
This is illustrated by the following example:

$X[10\underline{1}0\underline{1}00\underline{1}]_{sd2}=87_{dec}$ $Y[\underline{1}1\underline{1}00\underline{1}1\underline{1}]_{sd2}=101_{dec}$

\-\-\-\-\-\-\-\-\-\-\-\-\-\-\-\-\-\-\-\-=

S01001110

C1\underline{1}0001\underline{0}1

\-\-\-\-\-\-\-\-\-\-\-\-\-\-\-\-\-\-\-\-=

Sum $111000\underline{1}00=188_{dec}$

18. Conversion to Normal Binary Notation

In the last stage, the result is converted to normal binary notation. $X=X^+-X^-$ where $X^+$ is formed by all $x_i^+$ and $X^-$ is by all $x_i^-$.

Because $x_i^+$ and $x_i^-$ are never 1 at the same time, we do not need a full subtractor. Therefore, we try a different way.

We will remove all 1's going from the right to the left.
When there is no borrow from the right:
When the next digit is a '1' then the digit is kept and there is no borrow to the left.
When the next digit is a '0' then the digit is kept and there is no borrow to the left.
When the next digit is a '$\bar{1}$', then the '$\bar{1}$' is replaced by a '1' and there is a borrow to the left.
When there is a borrow from the right:
When the next digit is a '1' then the '1' is replaced by a '0' and there is no borrow to the left.
When the next digit is a '0', then the '0' is replaced by a '1' and there is a borrow to the left.
When the next digit is a '$\bar{1}$', then the '$\bar{1}$' is replaced by a '0' and there is a borrow to the left.

However, when the most left digit is a '1' and the most right digit is a '$\bar{1}$' and all digits in between are '0' (10 . . . 0$\bar{1}$), this will cause a too big delay.

To decrease the delay, we split the 32 bits into 8 groups of 4 bits.
When the most left non-zero digit is a '$\bar{1}$', then a borrow to the next left group is generated.
When there is at least one '1' in this group, a borrow form the right group is not propagated to the next group.

19. Multiplier Logic for GF(2N)

$X=x_{31}.\alpha^{31}+x_{30}.\alpha^{30}+\ldots x_1.\alpha^1+x_0.\alpha^0$ $Y=y_{31}.\alpha^{31}+y_{30}.\alpha^{30}+\ldots y_1.\alpha^1+y_0.\alpha^0$ $W=w_{31}.\alpha^{31}+w_{30}.\alpha^{30}+\ldots w_1.\alpha^1+w_0.\alpha^0$ For the representation of those vectors, one can read '2' instead of '$\alpha$' in the above formulae.

$$Z = X \cdot Y \oplus W.$$

$$Z = \sum_{i=0}^{31} \sum_{j=0}^{31} x_i \cdot y_j \alpha^{i+j}$$

$$Z_i = (y_{2i} \oplus y_{2i+1} \cdot \alpha) \cdot X + Z_i$$

There is no equivalent in GF($2^n$) for Booth coding.

In the first timeslot (see FIG. 4) X.Y(1:0)$\oplus$ W is calculated and stored in register $Z_0$. X is transferred to the second X-register and Y(31:2) to the second Y-register (Y).

In the second timeslot X.Y(3:2) $\oplus$ $Z_0$ is calculated and stored in register $Z_0$. X is transferred to the second X-register and Y(31:4) to the third Y-register (Y).

In the 16th timeslot $Z_{15}=$X.Y(31:30) $\oplus$ $Z_{15}$ is calculated and stored in register $Z_{15}$.

$Z_{15}$ contains now 64 bit.

In the last timeslot (#17), the upper 32 bit are transferred to $Z_{16}$ and $Z_{15}$ are added to the previous value of $Z_{16}$, which is output.

Doing long-integer multiplication as described in paragraph 13 then $Y_i$ is input $N_w$ times combined with $X_0$, $X_1, \ldots, X_{NW-1}$. When $X_0.Y_i \oplus$ W reaches the output Z, then instead of adding the contents of $Z_{16}$ nothing is added. $Z_{16}$ has the function of $Z_i$ in paragraph 13: the part that is transferred from one multiplication to the next one.

Figure 4:
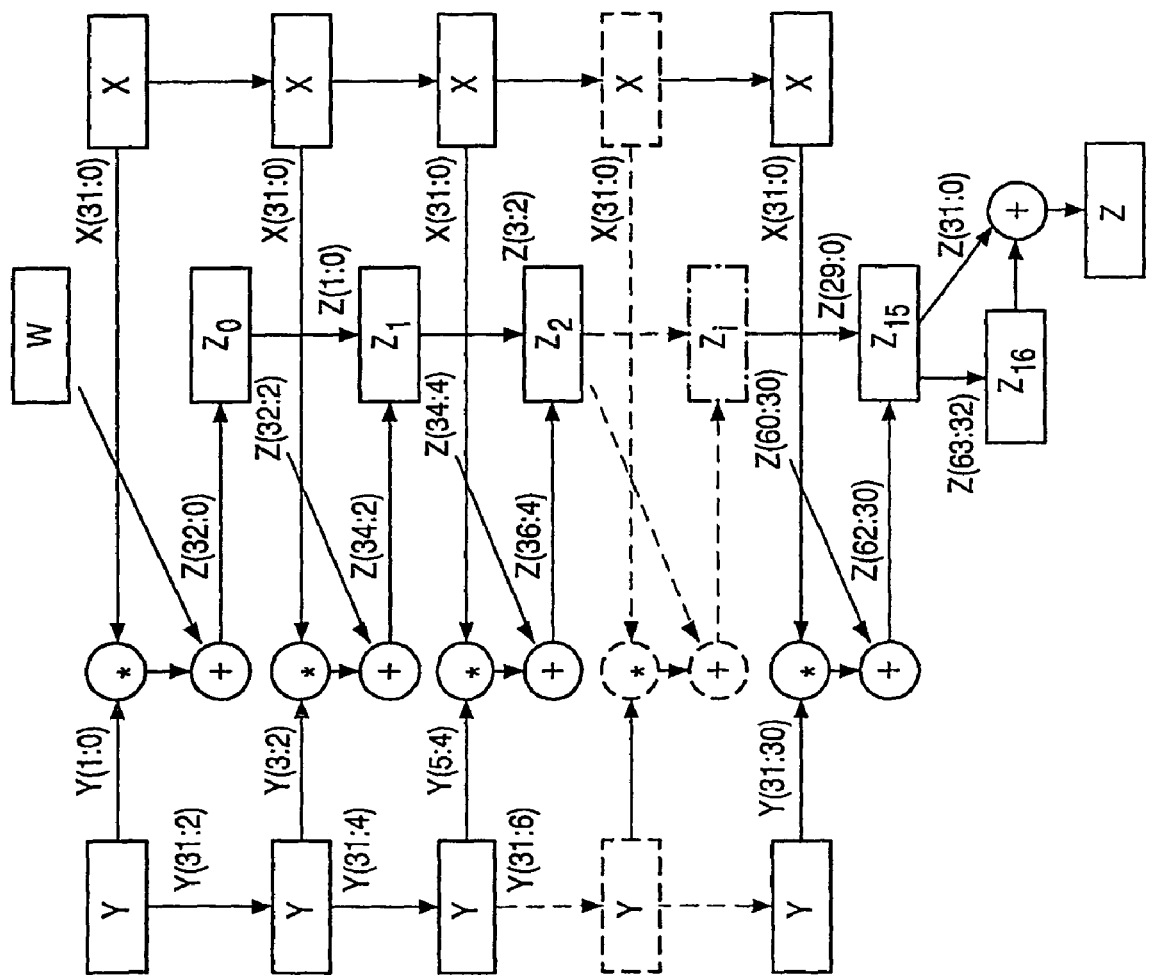
FIG. 4, a pipelined multiplier for a Galois field GF ($2^n$)

In particular, FIG. 4 illustrates an arrangement for a pipelined multiplier embodiment operating in GF $2^n$.

Adding

Adding is to exor of 2 variables. There is no carry.

Coding

Because we want to combine the logic with that of GF(p), we shall use the following redundant coding. So $X=X^{+\wedge}X^-$, wherein $^\wedge$ indicates a logical "OR" function.

TABLE 2

Encoding of X for GF($2^n$) in redundant binary notation (x = don't care).

| X | Output $x^+x^-$ | Input $x^+x^-$ |
|---|---|---|
| 0 | 00 | 0x |
| 1 | 10 | 1x |
| $\bar{1}$ | 01 | x1 |

20. Logic For Both (p) and GF($2^n$)

Both multiplier stages will use the following structure $z_j=a_i.x_{j-1}\oplus b_i.x_j$ GF(p)

GFp=1

$y'_i=-2.y_{i+1}+y_i+y_{i-1}$ (only for odd i, see Table 3 hereinafter)

TABLE 3

Encoding for GF(p)

| $y_{i+1}$ | $y_i$ | $y_{i-1}$ | $y'_i$ | $a_i$ | $b_i$ | $sign_i$ |
|---|---|---|---|---|---|---|
| 0 | 0 | 0 | 0  | 0 | 0 | 1 |
| 0 | 0 | 1 | 1  | 0 | 1 | 1 |
| 0 | 1 | 0 | 1  | 0 | 1 | 1 |
| 0 | 1 | 1 | 2  | 1 | 0 | 1 |
| 1 | 0 | 0 | −2 | 1 | 0 | 0 |
| 1 | 0 | 1 | −1 | 0 | 1 | 0 |
| 1 | 1 | 0 | −1 | 0 | 1 | 0 |
| 1 | 1 | 1 | 0  | 0 | 0 | 0 |

$GF(2^n)$
 $GFp = 0$ $a_i = y_{i-1}$ $b_i = y_i$ $z_j^+ = z_j = a_i.x_{j-1} \oplus b_i.x_j$ $z_j^- = 0$ Combined $a_i = (\overline{y_{i+1}}.y_i \wedge \overline{GFp}).y_{i-1} \wedge y_{i+1}.\overline{y_i}.\overline{y_{i-1}}.GFp$ $b_i = y_i \oplus GFp.y_{i-1}$ $z_j^+ = (a_i.x_{j-1} \oplus b_i.x_j).\overline{y_{i+1}}$ $z_j^- = (a_i.x_{j-1} \oplus b_i.x_j).\overline{y_{i+1}}.GFp$

21. Carry-Propagation-Free Addition

TABLE 4

Intermediate Carry and Sum.

| Type | $x_i$ | $y_i$ | $x_{i-1}$ | $y_{i-1}$ | $f_2$ | $f_5$ | $h$ | Intermediate Carry $c_i$ | Intermediate Sum $s_i$ |
|---|---|---|---|---|---|---|---|---|---|
| 1  | 1x | 1x | xx | xx | 0 | 0 | x | 10 | 00 |
| 2a | 1x | 00 | x0 | x0 | 1 | 0 | 1 | 10 | 01 |
|    | 00 | 1x | x0 | x0 | 1 | 0 | 1 |    |    |
| 2b | 1x | 00 | x1 | xx | 1 | 0 | 0 | 00 | 10 |
|    | 1x | 00 | xx | x1 | 1 | 0 | 0 |    |    |
|    | 00 | 1x | x1 | xx | 1 | 0 | 0 |    |    |
|    | 00 | 1x | xx | x1 | 1 | 0 | 0 |    |    |
| 3  | 00 | 00 | xx | xx | 0 | 0 | x | 00 | 00 |
| 4  | 1x | x1 | xx | xx | 0 | 0 | x | 00 | 00 |
|    | x1 | 1x | xx | xx | 0 | 0 | x |    |    |
| 5a | 00 | x1 | x0 | x0 | 0 | 1 | 1 | 00 | 01 |
|    | x1 | 00 | x0 | x0 | 0 | 1 | 1 |    |    |
| 5b | 00 | x1 | x1 | xx | 0 | 1 | 0 | 01 | 10 |
|    | 00 | x1 | xx | x1 | 0 | 1 | 0 |    |    |
|    | x1 | 00 | x1 | xx | 0 | 1 | 0 |    |    |
|    | x1 | 00 | xx | x1 | 0 | 1 | 0 |    |    |
| 6  | x1 | x1 | xx | xx | 0 | 0 | x | 01 | 00 |

Table 4 is identical to FIG. 6 with the encoding according to Table 1.

$f_2 = x_i^+.\overline{y_i^+}.\overline{y_i^-} \wedge \overline{x_i^+}.i^-.y_i^+$ $f_5 = \overline{x_i^+}.\overline{x_i^-}.y_i^{31} \wedge x_i^{31}.\overline{y_i^+}.\overline{y_i^-}$ $h = \overline{x_{i-1}^-}.\overline{y_{i-1}^-}$ $c_i^+ = x_i^+.y_i^+ \wedge f_2.h$ $c_i^- = x_i^-.y_i^- \wedge f_5.\overline{h}$ $s_i^+ = (f_2 \wedge f_5).\overline{h}$ $s_i^- = (f_2 \wedge f_5).h$ $S_i = c_{i-1} + s_i$

TABLE 5

Final sum $S_i$

| $c_{i-1}^+ \; c_{i-1}^-$ | $s_i^+ \; s_i^-$ | $S_i^+ \; S_i^-$ |
|---|---|---|
| 00 | 00 | 00 |
| 00 | 1x | 10 |
| 00 | x1 | 01 |
| 1x | 00 | 10 |
| 1x | 1x | — |
| 1x | x1 | 00 |
| x1 | 00 | 01 |
| x1 | 1x | 00 |
| x1 | x1 | — |

22. $GF(2^n)$
 $S_i = x_i \oplus y_i$

It appears that if we suppress the carries in the GF(p)-system, $S_i$, generated according to the rules of GF(p) gives the right answer, that is coded according to Table 2.

Combined logic $f_2 = x_i^+.\overline{y_i^+}.\overline{y_i^-} \wedge \overline{x_i^+}.\overline{x_i^{3T}}.y_i^+$ $f_5 = \overline{x_i^+}.\overline{x_i^+}.y_i^- \wedge x_i^-.\overline{y_i^+}.\overline{y_i^-}$ $h = \overline{x_{i-1}^-}.\overline{y_{i-1}^-}$ $c_i^+ = (x_i^+.y_i^+ \wedge f_2.h).GFp$ $c_i^- = (x_i^-.y_i^- \wedge f_5.\overline{h}).GFp$ $s_i^+ = (f_2 \wedge f_5).\overline{h}$ $s_i^- = (f_2 \wedge f_5).h$ $S_i^+ = \overline{c_{i-1}^+}.\overline{c_{i-1}^-}.s_i^+ \wedge c_{i-1} + \overline{s_i^+.s_i^-}$ $S_i^- = \overline{c_{i-1}^+}.\overline{c_{i-1}^-}.s_i^- \wedge c_{i-1}^- . \overline{s_i^+.s_i^-}$

23. Conversion from Redundant Binary to Binary

Input is a vector X with $x_i = \{1,0,1\}$. Output is a vector Y with $y_i = \{0,1\}$.

The vector X is divided in 8 groups of 4 bit, with $i = 4m+n$ ($n = 0 \ldots 3$, $m = 0 \ldots 7$).

Between groups:

The group borrow $g_m$ is generated when the most-left non-zero digit in this group is a '1'.

The group borrow $g_{m-1}$ is propagated, when the group does not have any '1' ($g_m = g_{m-1}$).

Within groups:

a borrow $b_i$ is generated when the digit is a '1'
 a borrow $b_i$, is propagated when the digit is no '1': $b_i = b_{i-1}$

TABLE 6

Output and Borrow within a group

| $b_{i-1}$ | $x_i^+ \; x_i^-$ | $y_i$ | $b_i$ |
|---|---|---|---|
| 0 | 00 | 0 | 0 |
| 0 | 1x | 1 | 0 |
| 0 | x1 | 1 | 1 |

TABLE 6-continued

| | Output and Borrow within a group | | |
|---|---|---|---|
| $b_{i-1}$ | $x_i^+ \ x_i^-$ | $y_i$ | $b_i$ |
| 1 | 00 | 1 | 1 |
| 1 | 1x | 0 | 0 |
| 1 | x1 | 0 | 1 |

$$g_{4i+3} = x_{4i+3}^- \cdot \overline{\Lambda x_{4i-3}^+} \cdot x_{4i+2}^- \cdot \overline{\Lambda_{4i+3}^+} \cdot \overline{x_{4i+2}^+} \cdot x_{4i+1}^- \cdot \overline{\Lambda x_{4i+3}^+} \cdot$$
$$\overline{x_{4i+2}^+} \cdot \overline{x_{4i+1}^+} \cdot \overline{x_{4i}^-} \cdot \Lambda \overline{x_{4i+3}^+} \cdot \overline{x_{4i+2}^+} \cdot \overline{x_{4i+1}^+} \cdot \overline{x_{4i}^+} \cdot g_{4i-1}$$

$y_i = (x_i^+ \Lambda x_i^-) \oplus b_{i-1}$ for $i \neq 0, 4, 8, \ldots, 28$ $y_i = (x_i^+ \Lambda x_i^-) \oplus g_{4i-1}$ for $i = 0, 4, 8, \ldots, 28$ $b_i = x_i^- \overline{\Lambda x_i^+} \cdot b_{i-1}$ 24. $GF(2^n)$ The conversion is simple, because there are no borrows. If we suppress all borrows, then the circuitry of GF(p) gives the correct answer.

Combined logic $$g_{4i+3} = x_{4i+3}^- \cdot \overline{\Lambda x_{4i-3}^+} \cdot x_{4i+2}^- \cdot \overline{\Lambda_{4i+3}^+} \cdot \overline{x_{4i+2}^+} \cdot x_{4i+1}^- \cdot \overline{\Lambda x_{4i+3}^+} \cdot$$
$$\overline{x_{4i+2}^+} \cdot \overline{x_{4i+1}^+} \cdot \overline{x_{4i}^-} \cdot \Lambda \overline{x_{4i+3}^+} \cdot \overline{x_{4i+2}^+} \cdot \overline{x_{4i+1}^+} \cdot \overline{x_{4i}^+} \cdot g_{4i-1}$$

$y_i = (x_i^+ \Lambda x_i^-) \oplus (b_{i-1} \cdot GFp)$ for $i \neq 0, 4, 8, \ldots, 28$ $y_i = (x_i^+ \Lambda x_i^-) \oplus (g_{4i-1} \cdot GFp)$ for $i = 0, 4, 8, \ldots, 28$ $b_i = x_i^- \overline{\Lambda x_i^+} \cdot b_{i-1}$ Pipelined Multiplier The pipelined multiplier as given in FIG. 1 can also be used for $GF(2^n)$, but $-Y[0]$ is to be set to '0' in the right part. All other adaptations were described above.

The invention claimed is:

1. A multiplier apparatus that is arranged for multiplying a first long integer entity with a second long integer entity modulo a prime number, which the apparatus is characterized by comprising a pipelined multiplier core, whilst executing the overall multiplication in Montgomery fashion, wherein the apparatus comprises:
   first registers to receive a first n-bit operand X;
   second registers to receive a second n-bit operand Y;
   third registers to receive a third n-bit operand W; and
   means for executing multiplications and additions on bits associated with the first n-bit operand X, the second n-bit operand Y and the third n-bit operand W from the first, second and third registers, the executing means being configured to sequentially perform an operation defined by $Z_i = X^* y + Z_{i-1}$, where i has a range from 0 to a predefined number equal to n/2-1, X represents the first n-bit operand X, y represents one or more bits of the second n-bit operand Y and $Z_{0-1}$ is the third n-bit operand W, the executing means being further configured to produce an n-bit output Z using the bits from $Z_i$ when i equals the predefined number n/2-1.

2. An apparatus as claimed in claim 1, furthermore being arranged for implementing a modified Booth algorithm.

3. An apparatus as claimed in claim 1, and being arranged for multiplying said first and second integer entities in the form of respective polynomials, and modulo an irreducible polynomial in a Galois Field $GF(2_n)$.

4. An apparatus as claimed in claim 1 and applied to executing an RSA-like Calculation.

5. An apparatus as claimed in claim 1, and applied to executing an Elliptic Curve Calculation.

6. An apparatus as claimed in claim 1, wherein the executing means is further configured to add upper n-bits of $Z_i$ and lower n-bits of $Z_i$ when i equals the predefined number n/2-1 to derive the n-bit output Z.

7. An apparatus as claimed in claim 1, wherein the executing means is further configured to subtract an artifact of the operation defined by $Z_i = X^* y + Z_{i-1}$ from one or more $Z_i$'s.

8. A multiplier apparatus for multiplying a first long integer entity with a second long integer entity modulo a prime number, the apparatus comprising:
   first registers to receive a first n-bit operand X;
   second registers to receive a second n-bit operand Y;
   third registers to receive a third n-bit operand W; and
   a plurality of adders and multipliers to execute multiplications and additions on bits associated with the first n-bit operand X, the second n-bit operand Y and the third n-bit operand W from the first, second and third registers, the plurality of adders and multipliers being configured to sequentially perform an operation defined by $Z_i = X^* y + Z_{i-1}$, where i has a range from 0 to a predefined number equal to n/2-1, X represents the first n-bit operand X, y represents one or more bits of the second n-bit operand Y and $Z_{0-1}$ is the third n-bit operand W, the plurality of adders and multipliers being further configured to produce an n-bit output Z using the bits from $Z_i$, when i equals the predefined number n/2-1.

9. An apparatus as claimed in claim 8, furthermore being arranged for implementing a modified Booth algorithm.

10. An apparatus as claimed in claim 8, and being arranged for multiplying said first and second integer entities in the form of respective polynomials, and modulo an irreducible polynomial in a Galois Field $GF(2_n)$.

11. An apparatus as claimed in claim 8 and applied to executing an RSA-like Calculation.

12. An apparatus as claimed in claim 8, and applied to executing an Elliptic Curve Calculation.

13. An apparatus as claimed in claim 8, wherein the plurality of adders and multipliers is further configured to add upper n-bits of $Z_i$ and lower n-bits of $Z_i$ when i equals the predefined number n/2-1 to derive the n-bit output Z.

14. An apparatus as claimed in claim 8, wherein the plurality of adders and multipliers is further configured to subtract an artifact of the operation defined by $Z_i = X^* y + Z_{i-1}$ from one or more $Z_i$'s.

* * * * *